Patented Oct. 25, 1949

2,485,935

UNITED STATES PATENT OFFICE 2,485,935

STABILIZED ICE-CREAM MIXES

Arnold B. Steiner, La Jolla, and Gerald D. Sperry, San Diego, Calif., assignors to Kelco Company, San Diego, Calif., a corporation of Delaware No Drawing. Application September 16, 1947, Serial No. 774,424

4 Claims. (Cl. 99—136)

This invention relates to improvements in the manufacture of ice cream and other frozen milk products and specifically to the stabilization of such products against ice crystal growth and to the production of a smooth and creamy body.

An ice cream mix consists essentially of a mixture of creams, milks and sugars so proportioned as to contain desired percentages of sugar, butter fat and milk solids. These proportions vary with trade requirements but may be said to average about 12% butter fat, 10% serum solids and 16% sugar by weight.

To produce an ice cream having a smooth body and to prevent the growth of ice crystals in storage it is common practice to add a small proportion of a stabilizer such as a sodium alginate composition. Sodium alginate alone is not adapted to this use, by reason of its incompatibility with the calcium salts of the milk and the difficulty in bringing it into solution in the mix, and it is therefore commonly used in the form of a composition.

This composition, described in United States Patent 2,097,228 to Howard J. Lucas, ordinarily contains about one-half part by weight of sodium alginate, the remainder being sugar and/or dextrin to assist in dispersing the solid alginate through the mix and thus promoting its solution, together with a buffer salt such as a water-soluble salt of phosphoric acid which functions to prevent precipitation of the alginic salt by calcium salts. In this composition an alginic salt, sodium alginate, is the effective stabilizing agent and the composition is referred to hereinafter as alginic salt composition to distinguish it clearly from the alginic esters which are the subject of the present invention.

While this alginic salt composition is a highly effective stabilizer for ice cream it has certain undesirable inherent properties which limit its commercial usefulness. These undesirable properties are not such as reduce the stabilizing value of the composition but have regard to certain elements of inconvenience in use and interference with the smooth progress of the mix through the succession of steps of manufacture of the frozen product. These undesirable characteristics of the composition are as follows:

(a) The relatively high temperature required to bring the alginic salt component into solution in the mix;

(b) The slow and viscid flow of the mix over the cooler and the attendant lowering of the cooling rate;

(c) The incompatibility of the composition with mixes having a developed acidity.

As described in detail in connection with the experiments following, the drawbacks incident to the use of the alginic salt composition are wholly avoided in the use as a stabilizer of the propylene glycol ester of alginic acid.

This ester may be prepared by the methods described in U. S. Patent 2,426,125 to Arnold B. Steiner and in the copending application of Arnold B. Steiner and William H. McNeely, filed December 22, 1945, under Serial No. 636,938. These methods consist, briefly, in reacting alginic acid with an excess of propylene oxide, with or without a previous partial neutralization of the acid with an alkali metal or ammonia. The reaction product, propylene glycol alginate (hereinafter referred to as the alginic ester), dissolves in water to give a pH value ordinarily below 5.0 and shows reduced reactivity with the salts and the acids which gelatinize or precipitate the soluble alginic salts.

While the alginic ester is more nearly compatible with calcium salts than are the soluble salts of alginic acid, this compatibility decreases as the pH of the solution is increased. For example, at pH 3.5 a solution of the alginic ester gives a soft gel when mixed with a calcium chloride solution; at pH 4.2 a harder gel is formed, and at pH 6.0 the solution rapidly sets up as a firm gel of still harder consistency. Prolonged heating to the boiling point does not melt this gel nor cause it to dissolve.

As the calcium salt content of ice cream mixes is highly appreciable (varying from 0.1¢ to 0.3% of the weight of milk present) and as the pH value of the mix ranges from 6.1 to 6.4, it is surprising to find that the alginic ester is soluble in such mixes without buffering. In many or most instances the alginic ester per se is more readily soluble than the buffered alginic salt composition, and no addition of phosphate or other buffer salts is required.

Again, solutions of the alginic ester are known to vary widely in viscosity, at equal concentrations, with change in pH value and to have very low viscosities as the neutral point is approached. For example, a 1¼% solution of propylene glycol alginate having a viscosity of 1000 centipoises at pH 3.5 decreased rapidly in viscosity as the pH value was gradually increased and had a viscosity of only 80 centipoises at pH 6.0. As the stabilizing value of sodium alginate falls off rapidly as the viscosity producing factor of the alginate decreases, and as the pH value of an ice cream mix is in the range in which the viscosity of the alginic ester is very low, it was expected that the unit stabilizing value of the ester would be correspondingly low, that is, that the quantity required to produce satisfactory stabilization would be large. The fact proved to be to the contrary, the alginic ester of low viscosity being fully as effective in stabilization of ice cream as an alginic salt composition of higher viscosity, no greater percentage addition to the mix being required.

The actual utility of propylene glycol alginate as an ice cream stabilizing agent is best shown by comparing its various features of behavior with those of the alginic salt composition, this being so well known in the trade and so commonly used as to afford a standard for comparison. The results of experiments showing such differences in behavior are set forth below.

SOLUTION TEMPERATURE

Solution of the alginic salt composition in the mix is slow and imperfect if the temperature be less than about 160° Fahr. at the time of addition. At lower temperatures, even with extended time, the composition is insoluble and no benefit is obtained from its use. For example, if the composition be added to the cold mix (e. g., at 60° F.) which is then brought up to temperature and pasteurized for one-half hour at 160° F. or even at the boiling point, 212° F., the composition forms clumps and fails to dissolve. About the lowest temperature at which it may be added is 145° F. and at that temperature solution is imperfect. On the other hand, the alginic ester dissolves readily at 110° Fahr. whether added at that temperature or to the cold mix. This factor is of major importance where it is preferred to pasteurize at low temperatures, of the order of 145° F. Also it is very convenient for the ice cream manufacturer to be able to add all of the dry ingredients (sugar, milk powder and stabilizer) at the time the cold mix is being prepared instead of withholding the stabilizer until the mix temperature is brought up to 160° F.

COOLING RATE COMPARISONS

The increase in effectiveness of the cooling step which follows from the substitution of the ester for the alginic salt composition is illustrated by the results of the following experiments. In these tests, identical ice cream mixes containing 12% butter fat, 10% serum solids and 14% sugar were treated with equal proportions of the two stabilizing agents. The weight of composition added was calculated on its sodium alginate content, the other components being inert as regards stabilization. The alginic ester was used as such, not as a composition.

In order to eliminate any possibility of error following from differences in viscosity of the original alginic acid used in the preparation of the stabilizers, all were prepared from the same sample of alginic acid, which was selected to have a low viscosity-producing factor. The differences in viscosity noted below would have been much greater had a high viscosity acid been used as the starting material.

The pasteurizing procedure followed was such as permitted the composition to pass completely into solution. The mixes were heated to 160° F. and the stabilizer added at that temperature. After pasteurization for one-half hour at 160° F. the mixes were homogenized at 2500 pounds pressure and immediately fed over a surface cooler, there being only an inappreciable intervening drop in temperature.

In the set of tests the results of which are shown in Table 1 the feed rate was maintained as nearly as possible uniform and equal, the difference in effectiveness being indicated by differences in temperature of the mixes flowing from the cooler. In the case of test 5 it was impossible to maintain the uniform feed rate for the mix stabilized with the composition, the cooled mix being so viscous that it stacked up in the trough and required that the feed be reduced. In each case the viscosity and temperature of the mix were taken as it came off the cooler.

TABLE 1

*Cooling tests at constant feed rate*

| Test No. | Conc. of Alginate | Vis. of Mix | | Temp. off Cooler | | Difference, °F. |
|---|---|---|---|---|---|---|
| | | Comp. | Ester | Comp. | Ester | |
| | Per cent | Cp. | Cp. | °F. | °F. | |
| 1 | 0.125 | 480 | 90 | 50 | 43 | −7 |
| 2 | 0.125 | 480 | 80 | 48 | 44 | −4 |
| 3 | 0.125 | 420 | 60 | 52 | 45 | −7 |
| 4 | 0.125 | 680 | 100 | 50 | 45 | −5 |
| 5 | 0.150 | 1,440 | 150 | 55 | 48 | −7 |

In another experiment the feed rates were so controlled as to bring two mixes off the cooler at the same temperature (40° F.), the variable being the time required to feed the test quantity (2 gallons) over the cooler. The mix stabilized with the alginic salt composition had a viscosity of 640 cp. and the feeding time was 360 seconds. The mix stabilized with the alginic ester had a viscosity of 100 cp. and the feeding time was 324 seconds, or 10 percent less than with the composition.

A reduction of ten percent in cooling time is a material advantage in the every day operation of an ice cream plant. The cooling time would of course be still further reduced if advantage were taken of the possibility of pasteurizing mixes stabilized with the ester at a lower temperature, for example 145° F. instead of at 160° F. As it is the practice to pass the pasturized mix directly to the cooler, the mix pasteurized at the lower temperature has less sensible heat to be withdrawn and the cooling time required to reach a desired temperature is reduced, as is the amount of refrigeration required. Mixes stabilized with the alginic salt composition cannot be pasteurized at this lower temperature by reason of the incomplete solubility of the composition.

EFFECT OF MIX ACIDITY ON SOLUBILITY

The acidity of the mix has an important effect on the solubility of the alginic salt composition. Normal acidity, determined by titration with an alkali and expressed as lactic acid, is ordinarily about 0.20% for a mix containing 11% serum solids and increases as the serum solids increase. The normal acidity of condensed milk may be as high as 0.50% as lactic acid.

When the titratable acidity of a mix is high, indicating developed acidity, an alginic salt composition stabilizer is not completely soluble. With incomplete solution the effectiveness of the stabilizer falls off rapidly and clots appear, in some cases forming gelatinous masses on the screens of the homogenizer.

In order to ascertain the effect of varying degrees of acidity on the solubilities of the ester and of the composition, samples of ice cream mix were allowed to stand at room temperature for different periods of time until they had developed acidities varying from 0.18% for fresh mix to 0.55% for aged mix. Each sample was then divided, each part being treated with the same quantity of the alginic salt composition or the alginic ester, the quantity added being 0.125% by weight. The additions were made at 160° F. as in the previous tests, the results as to solubility being noted as set forth in Table 2 below:

TABLE 2

*Solubility in acid mixes*

| Test No. | Mix Acidity as Lactic Acid | Solubility of Stabilizer | |
|---|---|---|---|
| | | Composition | Ester |
| | Per cent | | |
| 1 | 0.18 | Complete | Complete. |
| 2 | 0.20 | ----do------ | Do. |
| 3 | 0.31 | Poor | Good. |
| 4 | 0.43 | Insoluble | Do. |
| 5 | 0.50 | ----do------ | Do. |
| 6 | 0.55 | ----do------ | Do. |

These tests show a satisfactory solubility of the ester in each instance, regardless of the acidity of the mix. The solubility of the ester in test No. 6, in which the developed acidity was 0.55%, was equal to that in test No. 3 in which the acidity was only 0.31%, and only slightly poorer than that in tests Nos. 1 and 2 in which the acidity was normal for a fresh mix. On the other hand, the alginic salt composition gave poor solubility in test No. 3 and in the remainder of the tests, in which the acidity ranged from 0.43% to 0.55% the particles of alginic salt merely swelled in the mix and settled to the bottom of the container when agitation ceased.

EFFECTS OF AGING ON STABILIZED MIXES

It is characteristic of mixes stabilized with a sodium alginate composition to develop their full viscosity and their maximum whippability immediately, during the cooling step. It is characteristic of mixes stabilized with the alginic ester to develop their full viscosity slowly and to attain maximum whippability only after the lapse of several hours.

These widely divergent characteristics are illustrated by the results of an experiment in which samples of the same fresh mix were stabilized at 0.125% concentration with the alginic salt composition and the alginic ester respectively. The mixes were held at 40° F. for 96 hours and tested for viscosity at 24 hour intervals, any error due to thixotropy being avoided by passing the samples through a coarse screen before each test. The results are set forth in Table 3 below:

TABLE 3

*Viscosities after aging*

| Stabilizer Used | Viscosity in Centipoises | | | | |
|---|---|---|---|---|---|
| | Initial | After Aging | | | |
| | | 24 hrs. | 48 hrs. | 72 hrs. | 96 hrs. |
| Composition | 540 | 460 | 540 | 520 | 540 |
| Ester | 80 | 110 | 140 | 140 | 160 |

As in the previous tests, the composition and the ester were made from the same alginic acid and the quantity added was calculated on the sodium alginate component of the composition, the ester being added as such.

Samples of the above mixes were frozen immediately after cooling and also after aging for 24 hours. In the case of the mix stabilized with the ester it was difficult to obtain 80% overrun on the fresh mix in a batch freezer, while the aged mix and both the fresh and the aged mix stabilized with the composition whipped to 100% overrun without difficulty in both batch and continuous freezers.

If it is preferred to freeze immediately after cooling and batch freezing is practiced, delay may be avoided in the use of the ester by adding a minute proportion of a powerful emulsifying agent, such as the polyoxyethylene derivatives of stearic acid described in the copending application of Steiner & Miller, Serial No. 732,128, March 3, 1947, or the similar derivatives of sorbitan oleates and stearates described in the copending application of Arnold B. Steiner, Serial No. 691,667, filed August 19, 1946.

UNIFORMITY OF STABILIZATION

Samples of the mixes used in the experiments of Tables 1 and 3 were frozen after aging 12 hours in a six quart, counter type batch freezer to 100% overrun and were hardened in the usual manner. Pint cartons of the resultant ice creams were submitted to heat shock and shrinkage tests by holding the frozen samples for about two weeks in an insulated cabinet in which the temperature fluctuated between −5° and +12° Fahr.

The stored samples showed substantially no shrinkage nor ice crystal growth and all the ice creams were of good body and texture. The only distinction between ice creams stabilized with the composition and with the ester was observed when the amount of the stabilizer used exceeded the normal. For example, when the addition of stabilizer was increased from 0.125% to 0.150% the ice cream stabilized with the composition had a heavier, chewier body than that stabilized with the ester. At a concentration of 0.125% the ice creams were all well stabilized and of identical body.

LIMITATIONS AS TO PROPERTIES OF THE ESTER

To obtain a wholly satisfactory ice cream stabilizer, certain limitations as to the properties of the propylene glycol ester should be observed. The degree of esterification has a marked effect on the value of the ester as a stabilizer while the viscosity factor and the mesh size, though less critical, have considerable influence on the convenience with which the product may be used.

For the purpose of noting the effects of varying degree of esterification, samples of the ester were prepared by acting on the same low viscosity alginic acid with varying amounts of propylene oxide. The resultant esters varied from 24% to 70% esterification and were tested as to milk solubility, mix solubility, mix viscosity and temperature off cooler, at a uniform concentration of 0.150%. The results of these tests appear in the table below:

TABLE 4

*Variations in esterification*

| Pct. Est. | Sol. in Milk 145° F. | Behavior in Ice Cream Mix | | | |
|---|---|---|---|---|---|
| | | Sol. 160° | Flow over Cooler | Vis. Cps. | Cooled to |
| Per cent | | | | | °F. |
| 24 | Poor [1] | Fair | Thick, heavy, very slow. | 1,730 | 52 |
| 27 | ---do.[1] | ---do | ---do | 1,280 | 50 |
| 40 | ---do.[1] | ---do | Heavy, slow | 440 | 48 |
| 47 | Complete | Good | Thin, fast | 180 | 43 |
| 70 | ---do | ---do | ---do | 150 | 43 |

[1] Numerous insoluble particles floating on surface.

While all the above mixes made well stabilized ice creams, the excessive viscosity and resultant high cooler temperature of the mixes stabilized with the 24% and 27% esters makes these impractical for commercial use. The 40% ester is somewhat slow but is fully functional and appears to be at the lower limit of utility while at 47% the results are as satisfactory as at higher degrees of esterification. For this use the product should be at least 40% esterified and may desirably be brought to 45% esterification.

Differences in viscosity of aqueous solutions of the esters at equal concentration may be brought about by differences in degree of esterification, as above described, by variations in the chain length of the original alginic acid, and by other causes. We classify as "high" viscosity such esters as show, in aqueous solution at 2% concentration, at 20° cent. and at pH 3.5 a viscosity over 3500 centipoises, and as "low" viscosity such esters as show a viscosity of 1500 centipoises or less under the same conditions, all being over 40% esterified.

Regardless of the cause, a high viscosity in aqueous solution retards the flow over the cooler, elevates the temperature of the cooled mix and lengthens the time required for freezing to a given overrun.

These effects are illustrated by the results of an experiment in which samples of the same mix were stabilized each with 0.125% of esters of varying viscosity, all being over 40% esterified and of the same particle size, and the stabilized mixes were cooled and frozen. The results appear in the table below:

TABLE 5

*Variations in ester viscosity*

| Viscosity of Ester 2% Conc. | Behavior in Ice Cream Mix | | | | |
|---|---|---|---|---|---|
| | Sol. at 160° F. | Mix Viscosity | Flow over Cooler | Cooler Temp. | Freeze Time |
| | | Cps. | | °F. | |
| 1500 cps | Complete | 80 | Thin, fast | 44 | 15'50" |
| 3400 cps | Good | 120 | do | 45 | 17'30" |
| 6200 cps | do | 150 | do | 48 | 19'30" |

These same esters of varying viscosity were tested as to solubility in milk at 145° F. with 20 minutes stirring. The low viscosity ester was completely and readily soluble under these conditions while the medium and high viscosity esters were incompletely soluble, gel-like particles floating on the surface of the mix at the end of the stirring period. These higher viscosity esters become soluble at a somewhat higher temperature.

As ready solubility at a relatively low temperature, reduction of temperature of the mix over the cooler, and acceleration of freezing, are all desirable qualities, we prefer to use an ester of moderate to low viscosity, for example, not over 2500 centipoises in 2% aqueous solution. The esters of higher viscosity, however, are functional provided the high viscosity is not due to insufficient esterification.

The particle size to which the solid ester is reduced has an important effect on its solubility. For example, a low viscosity ester sized to pass through a 20 mesh standard screen dissolved only partially in an ice cream mix during 30 minutes pasteurization at 160° F., while the same ester sized to pass through a 60 mesh screen dissolved completely under the same conditions.

These differences are accentuated in mixes of developed acidity. In one test at an acidity of 0.50% an 80 mesh ester dissolved completely, a 60 mesh product dissolved somewhat less readily while a 20 mesh ester showed numerous undissolved particles floating in the pasteurized mix.

For these reasons we prefer that the ester should be sized to pass completely through a 40 mesh screen, though it is reserved that products of coarser mesh are functional under favorable conditions.

The quantity of the ester required to produce proper stabilization of the frozen product will in no case exceed 0.250% of the weight of the mix and in most cases will vary within the range from 0.075% to 0.150% by weight. Additions greater than the above maximum do not interfere with stabilization but have an undesirable effect on viscosity as well as being wasteful.

It is desirable though by no means essential to blend the comminuted ester with more or less an equal weight of an inert diluent such as sugar or dextrin. Such diluents facilitate dispersion of the powder through the mix and to that extent improve solubility; they facilitate the weighing out of the small quantities required for an individual batch, and they permit standardization of the stabilizing effect of esters which vary in that respect by making a corresponding variation in the extent of dilution. These agents function as diluents only, having no stabilizing effect, and the phosphates or other buffer salts required in the alginic salt composition are not needed and should not be used.

A limitation to not less than 40% esterification means that not less than 40% of the carboxyl groups of the alginic acid are combined with the propylene glycol radical, the remainder being either free or neutralized by a base which yields water-soluble alginates.

We claim as our invention:

1. The method of stabilizing an ice cream which consists in adding to the ice cream mix, prior to freezing the same, a small but effective quantity of a propylene glycol ester of alginic acid, said acid being not less than 40% esterified and in the form of solid particles which will pass substantially completely through a 40 mesh standard screen.

2. The method of stabilizing an ice cream which consists in adding to the ice cream mix, prior to freezing the same, a small but effective quantity of a propylene glycol ester of alginic acid, said acid being not less than 40% esterified, said ester having a viscosity in aqueous solution at 2% concentration and pH 3.5 not substantially exceeding 2500 centipoises.

3. An ice cream stabilized by the presence of a small but effective quantity of a propylene glycol ester of alginic acid, said acid being not less than 40% esterified.

4. An ice cream stabilized by the presence of a small but effective quantity of a propylene glycol ester of alginic acid, said ester having a viscosity in aqueous solution at 2% concentration and pH 3.5 not substantially exceeding 2500 centipoises, the acid of said ester being not less than 40% esterified.

ARNOLD B. STEINER.
GERALD D. SPERRY.

REFERENCES CITED

The following references are of record in the file of this patent:

UNITED STATES PATENTS

| Number | Name | Date |
|---|---|---|
| 2,097,229 | Lucas et al. | Oct. 26, 1937 |
| 2,426,125 | Steiner | Aug. 19, 1947 |